July 15, 1958      H. K. FLOLO      2,842,988

COMBINATION PIPE THREADING DIE AND REAMER

Filed Sept. 12, 1956

INVENTOR

HAROLD K. FLOLO

BY *Hugo E. Weisberger*

ATTORNEY

United States Patent Office 2,842,988
Patented July 15, 1958

2,842,988

COMBINATION PIPE THREADING DIE AND REAMER

Harold K. Flolo, Houston, Tex.

Application September 12, 1956, Serial No. 609,481

3 Claims. (Cl. 77—73)

This invention relates to combination pipe threading dies and reamers, and more particularly to a pipe threading die having a self-centering reamer mounted thereon.

When a pipe is severed by means of a pipe cutter, there usually remains at the inner edge of the cut end a jagged flange or burr which should be removed. Numerous devices have been provided in the prior patented art for reaming the end of the pipe simultaneously with the threading of the exterior surface of the end of the pipe. In all of the prior combination pipe threading and reaming devices, the reamer has been rigidly mounted on the pipe threading die or on the die stock assembly which holds the die. This fixed position of the reamer relative to the die sometimes results in uneven reaming and greater wear on the reamer, with consequent more frequent need for replacement of the reamer. While in some of the prior art devices the fixed position of the reamer relative to the die is adjustable, the necessity for manual adjustment of the reamer position is time consuming and retards the pipe threading operation.

Accordingly, it is an object of this invention to provide a combination pipe threading and reaming device in which the reamer is automatically self centering relative to the pipe being reamed, to thereby provide a more even reaming action than devices of the prior art.

It is another object of this invention to provide a combination pipe threading and reaming device so constructed as to reduce wear on the reamer and increase the period of its service.

In achievement of these objectives, there is provided in accordance with an embodiment of this invention a combination pipe threading and reaming device in which the reamer is mounted on the thread cutting die and supported for free sliding movement laterally across the die opening. The slidable mounting of the reamer permits it to center itself with respect to the pipe being reamed, resulting in an even reaming operation and preventing unevenness of wear on the reamer.

Further objects and advantages of the invention will become apparent from the following description taken in conjunction with the accompanying drawing in which.

Figure 1:
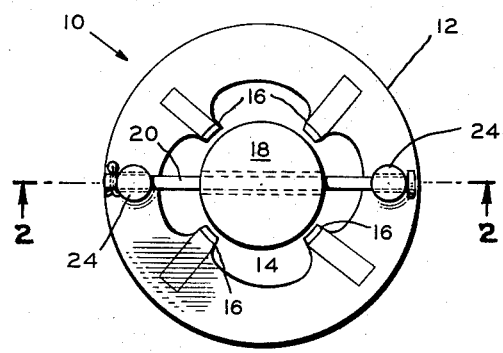
Fig. 1 is a top plan view of a combination pipe threading die and reamer in accordance with the invention.

Referring now to the drawing, the combination pipe threading die and reamer is generally indicated at 10 and includes a die member 12 having a central opening 14 into which extend a plurality of circumferentially spaced thread cutting edges 16. Cutting edges 16 engage the outer surface of the end of pipe P which is being threaded, the end of pipe P extending into opening 14.

Figure 2:
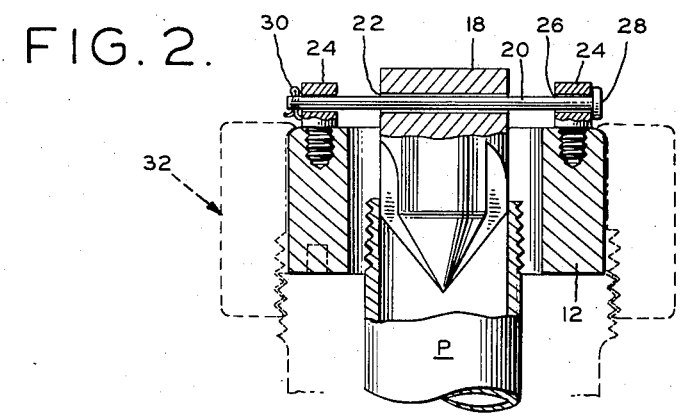
Fig. 2 is a view in vertical section along the line 2—2 of Fig. 1.

A reamer 18 for reaming the inner edge of pipe P is supported by die member 12, the cutting edge of the reamer extending into opening 14 of the die member. Reamer 18 is slidably supported by a shaft 20 which passes laterally across die opening 14 and through a passage 22 in the reamer. The diameter of passage 22 through reamer 18 is made sufficiently larger than the outer diameter of shaft 20 to permit an easy sliding movement of reamer 18 along the shaft. In addition to permitting sliding movement of reamer 18 across die opening 14, shaft 20 also serves to prevent rotation of the reamer relative to the die member 12. Reamer 18 may be of any suitable type and, for example, may have a cutting surface similar to that used in a countersink drill, as best seen in Fig. 2.

Shaft 20 is supported in easily detachable relation to die member 12 by a pair of oppositely disposed threaded stud or bolt members 24 positioned in tapped holes in the upper face of the die member 12. The head portion of each stud member 24 has a passage 26 through which an end of shaft 20 extends. Shaft 20 is maintained in position due to the provision of an enlarged portion 28 at one end, and by a cotter pin 30 passing through the opposite end. If desired, cotter pins or other suitable retaining means may be used at both ends of shaft 20. The reamer extends into die opening 14 for a distance such that the inner end of the reamer is adjacent the inner or lower surface of die member 12, so that the reamer enters the open end of pipe P at substantially the same time that the die member begins to thread the outer surface of the pipe.

Figure 3:
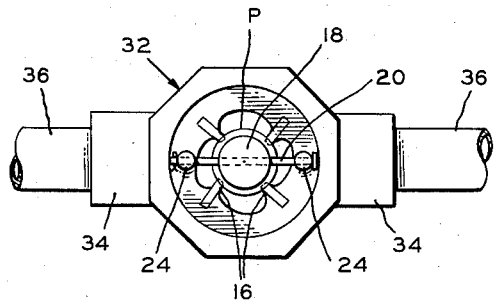
Fig. 3 is a top plan view, partially broken away, showing the combination pipe threading die and reamer mounted in a die stock.

As shown in Fig. 3, die member 12 is secured in a die stock generally indicated at 32, the die member and die stock being in threaded engagement with each other. However, dies of other shapes and construction and corresponding locking arrangements may be used. The die stock includes collar portions 34 which receive handle members 36 used in rotating the die stock during the threading operation. The die stock may be of a multiple type receiving a plurality of different sizes of dies for threading pipes of different outer diameters. Different sizes of reamers may be used interchangeably with any given die, depending upon the internal diameter of the pipe being reamed.

In operating the combination thread cutting and reaming device, die stock 32 is rotated by means of handles 36, causing cutting edges 16 of die 12 to cut a thread on the outer surface of pipe P. Simultaneously, the end of reamer 18 enters the open end of pipe P and reams the burr produced during the pipe cutting operation. During the reaming operation, the ream has a self centering action due to its sliding support on shaft 20. This self-centering action produces an even reaming action and avoids uneven wear on the reamer which would require its premature replacement. The engagement of reamer 18 with shaft 20 also prevents rotation of the reamer relative to the thread cutting die. It can be seen, therefore, that the combination pipe threading die and reamer hereinbefore described has great utility and represents an improvement over the prior art.

While there has been shown and described a particular embodiment of the invention, it will be obvious to those skilled in the art that various changes and modifications may be made therein without departing from the invention, and, therefore, it is aimed in the appended claims to cover all such changes and modifications as fall within the true spirit and scope of the invention.

I claim:

1. In combination, a pipe threading die having a central opening for receiving a pipe to be threaded, a reamer having a cutting edge extending into the central opening for reaming the inner edge of the pipe, and means mounted on said die and supporting said reamer for free sliding movement diametrically of said opening whereby said reamer is self centering in the pipe.

2. In combination, a pipe threading die having a central opening for receiving a pipe to be threaded, a reamer having a cutting edge extending into the central opening for reaming the inner edge of the pipe, a shaft extending diametrically across the opening of said die, means carried by said die supporting said shaft, said reamer being mounted on said shaft for free sliding movement laterally across said opening whereby said reamer is self centering in the pipe.

3. In combination, a pipe threading die having a central opening for receiving a pipe to be threaded, a reamer having a cutting edge extending into the central opening for reaming the inner edge of the pipe, said reamer having a passage extending through the body thereof, a shaft extending diametrically across the opening of said die and through the passage of said reamer, means on said die supporting said shaft, said reamer being slidably movable along said shaft laterally across said opening whereby said reamer is self centering in the pipe.

References Cited in the file of this patent

UNITED STATES PATENTS

| | | |
|---|---|---|
| 1,026,668 | Frost | May 21, 1912 |
| 1,052,308 | Bloomington | Feb. 4, 1913 |
| 1,731,727 | Richman | Oct. 15, 1929 |